(12) United States Patent
Kato et al.

(10) Patent No.: US 8,690,122 B2
(45) Date of Patent: Apr. 8, 2014

(54) VALVE DEVICE

(75) Inventors: Tomokuni Kato, Tokyo (JP); Masayuki Yokoyama, Tokyo (JP); Youichi Fujita, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 791 days.

(21) Appl. No.: 12/682,546

(22) PCT Filed: Sep. 8, 2008

(86) PCT No.: PCT/JP2008/002468
§ 371 (c)(1),
(2), (4) Date: Apr. 9, 2010

(87) PCT Pub. No.: WO2009/084131
PCT Pub. Date: Jul. 9, 2009

(65) Prior Publication Data
US 2010/0270486 A1    Oct. 28, 2010

(30) Foreign Application Priority Data

Dec. 27, 2007   (JP) ................................. 2007-335885

(51) Int. Cl.
*F16K 31/44* (2006.01)
(52) U.S. Cl.
USPC ...... 251/267; 251/129.11; 251/273; 251/274; 123/568.24; 123/568.26
(58) Field of Classification Search
USPC ............ 251/129.11, 264, 266, 267, 273, 274, 251/229; 123/568.11, 568.21, 568.23, 123/568.24, 568.26
See application file for complete search history.

(56) References Cited

U.S. PATENT DOCUMENTS 4,782,811 A * 11/1988 Hewette et al. .......... 123/568.24
4,832,311 A *  5/1989 Kimura ........................ 251/118
(Continued)

FOREIGN PATENT DOCUMENTS

DE         10158929 A1    6/2002
DE    112005000035 B4    4/2011
(Continued)

*Primary Examiner* — John K Fristoe, Jr.
*Assistant Examiner* — Matthew W Jellett
(74) *Attorney, Agent, or Firm* — Birch, Stewart, Kolasch & Birch, LLP.

(57) ABSTRACT

A valve device has integrally assembled thereto a valve side housing 2 having a valve seat 1, a motor side housing 4 provided with a motor 3, and a feeder-side housing 5 having a feeder unit, wherein a valve stem 8 provided with a valve 7 for abutting against the valve seat 1 is extended to the interior of the feeder-side housing, a rotation stopper 9 of the valve stem 8 is provided at a predetermined position of the valve stem on its way to the feeder-side housing, a screw section 11 is provided around the portion of the valve stem passing through the center hole 35a of the rotor 35 of the motor 3, the screw section being in mesh with a thread section 10 formed around the surface of the center hole thereof, and a valve position detecting sensor is provided within the feeder-side housing 5.

2 Claims, 2 Drawing Sheets

(56) References Cited

U.S. PATENT DOCUMENTS

| | | | |
|---|---|---|---|
| 5,060,910 A * | 10/1991 | Iwata et al. | 251/129.05 |
| 6,224,034 B1 * | 5/2001 | Kato et al. | 251/164 |
| 6,227,183 B1 * | 5/2001 | Miyoshi et al. | 123/568.23 |
| 6,415,776 B1 * | 7/2002 | Gates et al. | 123/568.24 |
| 2001/0050346 A1 * | 12/2001 | Fujita et al. | 251/129.11 |
| 2002/0069841 A1 | 6/2002 | Miller | |
| 2003/0089350 A1 * | 5/2003 | Fujita et al. | 123/568.21 |
| 2004/0040798 A1 * | 3/2004 | Fujita et al. | 188/156 |
| 2006/0071190 A1 * | 4/2006 | Pfister | 251/129.11 |
| 2008/0247694 A1 * | 10/2008 | Hatano et al. | 384/428 |

FOREIGN PATENT DOCUMENTS

| | | |
|---|---|---|
| JP | 52-114908 A | 9/1977 |
| JP | 3-93439 A | 4/1991 |
| JP | 2002-34228 A | 1/2002 |
| JP | 3719915 B2 | 9/2005 |
| JP | 2006-5987 A | 1/2006 |
| JP | 2006-161683 A | 6/2006 |
| WO | WO 2005/124970 A1 | 12/2005 |

* cited by examiner

VALVE DEVICE

TECHNICAL FIELD

The present invention relates to a valve device that is provided, for example, in an exhaust-gas return passage for returning a portion of exhaust gas to an intake side, as in an EGR (Exhaust Gas Recirculation) system for controlling the amount of return of the exhaust gas, and that integrally assembles a valve side housing having a valve seat, a motor side housing provided with a motor, and a feeder-side housing having a feeder unit.

BACKGROUND ART

A conventional valve device of the foregoing type is arranged such that a motor shaft is axially moved by the rotation of a motor rotor to cause the lower end of the motor shaft to abut against the upper end of a valve stem and a valve element is detached from a valve seat with the following movement of the motor shaft. Thus, the conventional valve device is constituted of a motor shaft and a valve stem which are formed independently from each other, and the shock caused by the collision of a valve element with a valve seat at the time of closing of the valve has been reduced during the time interval in which the motor shaft is being moved in a space leading to a motor stopper by the inertial force of the rotor after the motor shaft is separated from the valve stem.

Otherwise, there is a valve device where a motor shaft and a valve stem have an integrally assembled structure as disclosed in Patent Document 1; however, the valve device is one where a space is provided at both sides of a male screw and a female screw in order to restrict the rotation of a rotor at the time of fully closing of the valve.

Patent Document 1: Japanese Patent Gazette No. 3719915

However, in the conventional valve device constituted of a motor shaft and a valve stem which are independently formed, the motor shaft and the valve stem are separated from each other at the time of undershooting in the valve closing operation, at the time of initialization (operation for studying the initial position), or at the time of seizure of the valve stem, and therefore, an error may arise between a valve position and the output of a sensor detecting the valve position. As a result, there is a problem that there may arise a situation where the valve position cannot be accurately monitored in the engine.

Further, Patent Document 1 does not disclose the detection of the valve position through the valve stem.

The present invention has been made to solve the above-mentioned problems, and an object of the present invention is to provide a valve device such that detection accuracy of a valve position is improved and that pre-load measures to be required at the time of fully closing of the valve is eliminated.

DISCLOSURE OF THE INVENTION

The valve device according to the present invention has integrally assembled thereto a valve side housing having a valve seat, a motor side housing provided with a motor, and a feeder-side side housing having a feeder unit, wherein a valve stem provided with a valve for abutting against the valve seat is extended to the interior of the feeder-side housing, a rotation stopper or stopping means of the valve stem is provided at a predetermined position of the valve stem on its way to the feeder-side housing, a screw section is provided around the portion of the valve stem passing through the center hole of the rotor of the motor, the screw section meshing with a thread section formed around the surface of the center hole thereof, and a valve position detecting sensor is provided within the feeder-side housing.

According to the present invention, the valve stem is extended to the sensor position through the rotor of the motor, and thus the detection of the valve position can be accurately performed.

BEST MODE FOR CARRYING OUT THE INVENTION

Embodiment of the present invention will now be described with reference to the accompanying drawings in order to explain the present invention in more detail.

First Embodiment

Figure 1:
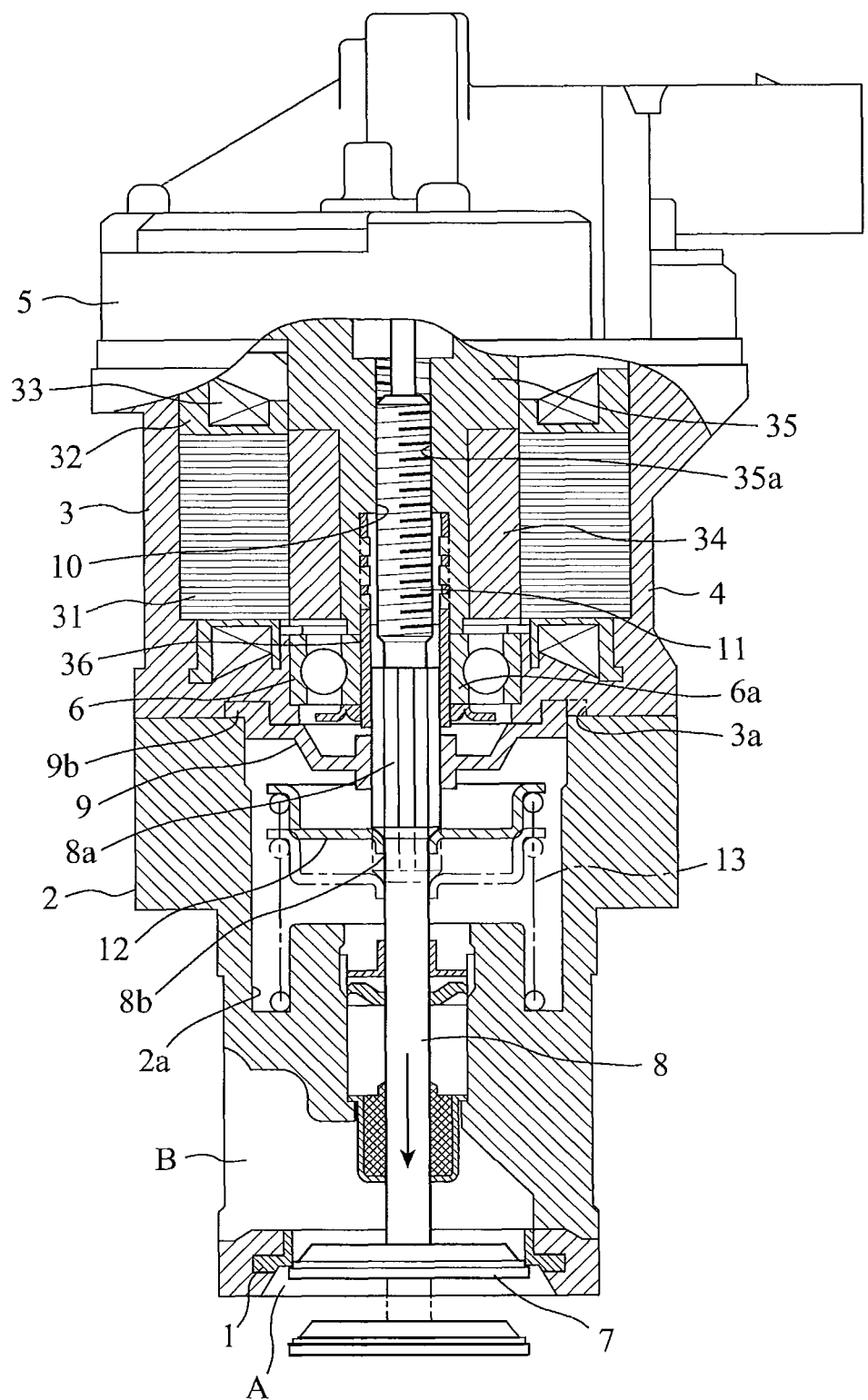
FIG. 1 is a view of a valve closed state of a valve device showing an embodiment.
Figure 2:
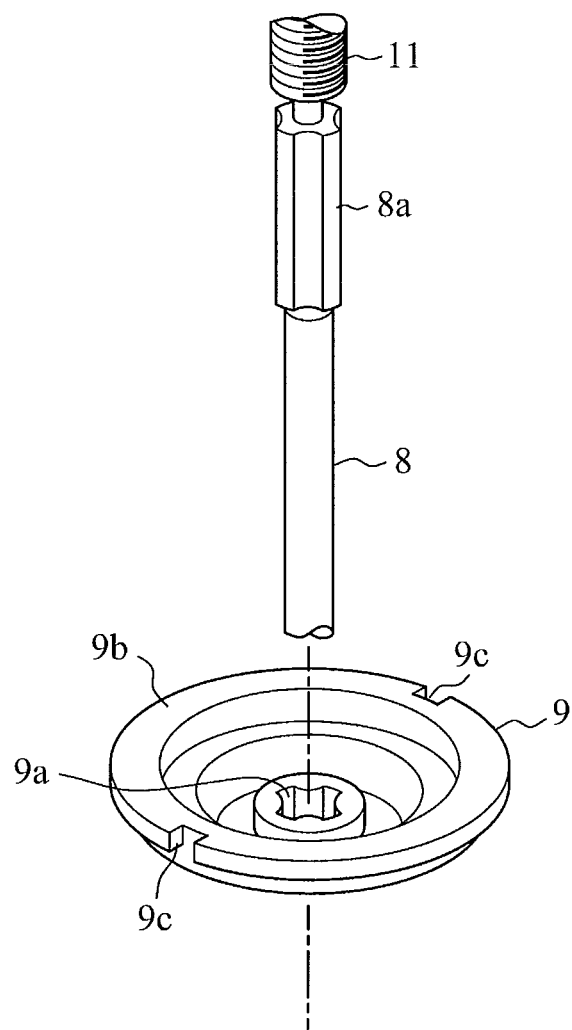
FIG. 2 is a plan view illustrating a rotation stopper.

Figures are longitudinal sectional views showing a composition of a valve device in accordance with an embodiment of the present invention. FIG. 1 is a view illustrating a valve closed state, and FIG. 2 is a plan view illustrating a rotation stopper or stopping means. In the figures, a valve device is an arrangement to integrally assemble a valve side housing 2 having a valve seat 1 at the boundary between an inlet passage A and a discharge passage B, a motor side housing 4 including a motor 3, and a feeder-side housing 5 having a feeder unit (not shown).

The motor 3 is composed of: a stator iron core 31 unified with the motor side housing 4, a coil 33 wound around both ends of the stator through a bobbin 32, and a rotor 35 having a permanent magnet 34 provided around the outer peripheral surface thereof and rotatably provided in the center of the stator iron core 31. Further, with respect to the rotor 35, a metallic pipe 36 is press fitted and fixed inside an inner ring 6a of a bearing 6 serving as a shaft bearing, and assembled and inserted therein for fixation with a portion of the pipe protruded from the center of the lower end of the rotor; the outer periphery of the bearing 6 is secured in the motor side housing 4 by insertion of a resin.

A valve stem or shaft 8 provided with a valve 7 for abutting against the valve seat 1 is extended to the interior of the feeder-side housing 5, the portion of the stem passing through the center hole 35a of the rotor 35 of the motor 3 is provided with a screw section 11 meshing with a thread section 10 formed around the surface of the center hole thereof, and a valve position detecting sensor (not shown) for detecting the valve position by detecting the position of the valve stem is provided inside the feeder-side housing 5. In this context, the lower end of the valve stem 8 is press fitted into the valve 7, and then is high-spin caulked for preventing the valve from falling out of the lower end thereof.

Moreover, a rotation stopper 9 of the valve stem 8 is provided at a predetermined position of the valve stem on its way to the feeder-side housing 5. As shown in FIG. 2, the rotation stopper 9 is provided at equally spaced intervals around the inner peripheral surface thereof with protrusions 9a to engage in grooves 8a provided parallel in an axial direction at substantially equally spaced intervals around the peripheral surface of the valve stem 8, and provided around the outer peripheral section thereof a boss 9b to be assembled between the valve side housing 2 and the motor side housing 4. Further, the boss 9b is provided at several places of the fringe thereof with notches 9c for positioning, and the valve side housing 2 is assembled to the motor side housing 4 such that convexities 3a of the motor side housing 4 engage in the notches 9c. The valve stem 8 is provided with a spring receiver 12 using a shoulder or step 8b of the lower end of each of the grooves 8a, and a spring 13 for exerting an urging force on the valve stem 8 in the valve closing direction is provided between the spring receiver 12 and a concavity 2a within the valve side housing 2.

Next, the operation of the valve device will be described. When the coil 33 is energized on the basis of a signal from an external system by way of a feeder circuit (not shown) within the feeder-side housing 5, a magnetic field generated by the energization acts on the permanent magnet 34 of the rotor 35 to thus rotate the rotor. The rotation of the rotor 35 exerts a torque on the valve stem 8 through the screw section 11 in mesh with the thread section 10; however, since the protrusions 9a of the rotation stopper 9 are in engagement with the grooves 8a around the peripheral surface of the valve stem 8, the valve stem 8 does not rotate, but moves in the direction indicated by the arrow in an axial line. Therefore, the valve 7 attached on the lower end of the valve stem 8 moves to the chain-line position to open the passage, and thereby provides a communication between the inlet passage A and the discharge passage B.

Furthermore, under the condition where the valve 7 is opened as described above, when the feeding direction of the coil 33 is reversed, the rotation of the rotor 35 is reverse to that of the above-described; thus, the valve stem 8 is moved in the opposite direction from that indicated by the above arrow, and the valve 7 is abutted against the valve seat 1 to close the passage. Since the valve stem 8 stops at the position where the valve 7 is closed, the stopped position thereof can be detected with a sensor to thereby detect accurately the position of the valve 7. Further, upon abutment of the valve, the rotor 35 is attracted to the side of the valve 7. For this reason, in a conventional arrangement, a pre-load spring is caused to act on the rotor 35; however, there is a potential risk for the rotor 35 to crush and damage the pre-load spring due to the force of attracting the rotor 35.

Hence, according to the present invention, the metallic pipe 36 inserted and fixed in the rotor 35 is press fitted and fixed in the inner ring 6a of the bearing 6, and the bearing 6 is secured in the motor side housing 4 by insertion of a resin; the arrangement can secure the bearing 6 in an axial direction. In this way, the necessity of the pre-load spring conventionally required can be eliminated. Further, the accuracy of coaxiality between the inner diameter of the rotor 35 and the bearing 6 can be improved.

Moreover, in the valve-opened state where the valve 7 is opened, as the valve stem 8 moves, the spring 13 is compressed by the spring receiver 12, and thus the restoring force of the spring 13 can secure the vibration proof of the spring receiver 12. Then, in the event that the energization to the coil 33 is failed because of the disconnection of feeder wire or the like, the valve stem 8 is moved in the opposite axial direction from the arrow by the energizing force of the spring 13, thus causing the valve 7 to abut against the valve seat 1. At that time, when the valve stem 8 is moved in the axial direction, the rotor 35 can be rotated in the opposite direction to that upon opening of the valve by the screw section 11 in mesh with the thread section 10.

As discussed above, in accordance with the embodiment, by causing a single valve stem to have the functions of the motor shaft and the valve stem, the valve attached on the tip of the valve stem can be prevented from being wobbled and shifted in the axial direction, and thus the detection accuracy of the valve 7 performed by the sensor in the feeder-side housing can be improved.

Furthermore, by fittingly assembling the valve side housing 2 to the motor side housing 4 by interposing the boss 9b of the rotation stopper 9 therebetween, the accuracy can be increased with respect to the misalignment during the assembly. Besides, the axis misalignment between the motor 3 provided in the motor side housing 4 and the valve side housing 2 can be prevented from occurring in assembly. In this way, the unbalanced load placed on the thread section 10 of the rotor 35 by canting of the valve stem 8 can be reduced, and the unbalanced wear of the thread section 10 of the rotor 35 caused by the valve operation can be reduced.

Industrial Applicability

As discussed above, the valve device according to the present invention is arranged such that the valve stem is caused to pass through the rotor to be extended to the sensor position. Thus, the detection of the valve position can be accurately performed, and the valve device is suitable for use in an EGR valve apparatus or the equivalent.

The invention claimed is:

1. A valve device integrally assembling a valve side housing having a valve seat, a motor side housing provided with a motor, and a feeder-side housing, further comprising:
   a valve stem provided with a valve for abutting against the valve seat, and extending through a center hole of a rotor of the motor provided in the motor side housing to an interior of the feeder-side housing;
   a rotation stopper having an outer peripheral section and an inner peripheral section through which the valve stem passed on its way to the feeder-side housing; and
   a screw section provided around a portion of the valve stem passing through the center hole of the rotor of the motor to be in mesh with a thread section formed around the surface of the center hole thereof, wherein
   the inner peripheral section of the rotation stopper includes protrusions provided in an axial direction at substantially equally spaced intervals and the outer peripheral section of the rotation stopper includes a boss fixed between the valve side housing and the motor side housing, and
   the rotor of the motor includes a metallic pipe inserted and fixed therein with a portion of the metallic pipe to be protruded therefrom, the protruded portion thereof being fixed in a bearing and the bearing being secured in the motor side housing by insertion of a resin.

2. The valve device according to claim 1, wherein the protrusions of the inner peripheral portion of the rotation stopper engage grooves provided around a peripheral surface of a portion of the valve stem, and the boss of the outer peripheral section of the rotation stopper includes one or more notches engaging convexities of the motor side housing.

* * * * *